United States Patent [19]

Laing

[11] Patent Number: 4,834,628
[45] Date of Patent: May 30, 1989

[54] ROTOR-MAGNET UNIT

[76] Inventor: Karsten A. Laing, 1253 La Jolla Ranch Rd., La Jolla, Calif. 92037

[21] Appl. No.: 871,822

[22] Filed: Jun. 9, 1986

[51] Int. Cl.[4] ............................................. F04B 17/00
[52] U.S. Cl. ................................................... 417/420
[58] Field of Search ................ 417/420; 310/104, 156, 310/157

[56] References Cited

U.S. PATENT DOCUMENTS

| | | | |
|---|---|---|---|
| 3,238,883 | 3/1966 | Martin | 417/420 |
| 3,470,824 | 10/1969 | O'Conner | 417/420 |
| 3,489,095 | 1/1970 | Eheim | 417/420 |
| 3,494,708 | 2/1970 | Nunlist et al. | 416/244 |
| 3,696,913 | 10/1972 | Anders | 416/244 |
| 3,767,330 | 10/1973 | Sigrovile | 417/420 |
| 3,877,844 | 4/1975 | Klaus et al. | 417/420 |
| 4,165,206 | 8/1979 | Martin et al. | 417/420 X |
| 4,257,744 | 3/1981 | Watson | 416/244 |

Primary Examiner—Carlton R. Croyle
Assistant Examiner—Eugene L. Szczecina, Jr.

[57] ABSTRACT

The invention is concerned with magnetically driven centrifugal pumps whose rotor forms a unit with an impeller, which is located in a rotary magnetic field. The rotor is mounted to said impeller by a spring loaded clamp.

1 Claim, 3 Drawing Sheets

ROTOR-MAGNET UNIT

BACKGROUND OF THE INVENTION

Pumps with magnetically driven rotors that have an airgap along a spherical surface show significant advantages relative to other centrifugal pumps because the most unreliable elements of conventional centrifugal pumps, namely shafts, bushings and rotary sealings, are eliminated. The driven rotor, which forms a rotary unit with the impeller, is not only magnetically coupled with the driving system, but at the same time is axially supported by a spherical bearing that cannot block or seize.

Magnets of sufficient coercive force are made from barium or strontium ferrites or aluminium-nickel-cobalt alloys. Neither of these materials can be welded, brazed, or machined. Joining of the plastic impeller to the annular magnet presents a problem. While the outer driving magnet can be fixed by a suitable adhesive at the hub, this is not possible with the driven magnet because it is immersed in liquid, where adhesives would deteriorate even in water. Because magnetic material is unsuitable for machining, it has been necessary in the past to enclose ceramic magnets in a plastic housing. However, this method has the disadvantage that the thickness of the effective magnetic gap is increased by the thickness of the plastic housing, and this leads to a considerable decrease in the transmittable torque.

SUMMARY OF THE INVENTION

The invention eliminates this disadvantage. According to the invention, the vanes of the impeller, which is composed of a shroud on the suction side, the vanes, and the hub, is pressed with a strong spring clamp against the axial face of the annular magnet. This leads not only to a secure connection, but the spring nature of the clamp compensates the thermal expansion and the inevitable creeping of the plastic material of the impeller. In addition, the impeller does not require a disk on the pressure side to cover the vanes. Furthermore, the assembly time of the magnetic rotor-impeller unit is reduced to several seconds.

DESCRIPTION OF DRAWINGS

The invention is described with the aid of the following figures.

DETAILED DESCRIPTION OF THE PREFERRED EMBODIMENTS

Figure 1:
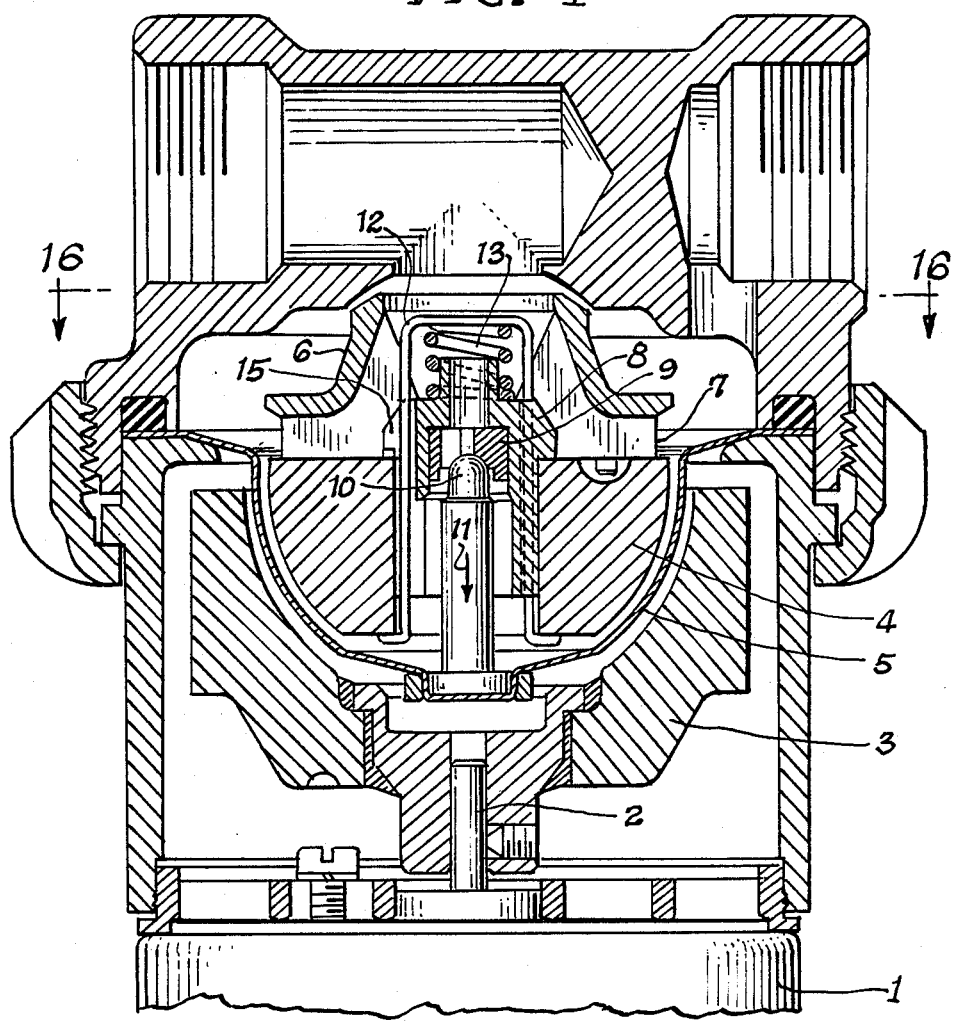
FIG. 1 shows a horizontal view through a centrifugal pump with a spherical magnetic coupling.

FIG. 1 shows a centrifugal pump with an impeller designed according to the invention. Motor (1) drives the concave outer magnet (3) by means of the shaft (2). The magnet (3) transfers the torque to the driven convex annular magnet (4), whereby the motor compartment is hermetically sealed from the pump compartment by the spherical separation wall (5). The annular magnet (4) forms a single rotating unit with a single-piece impeller, which is composed of the shroud (6), vanes (7), and the hub part (8). The spherical bearing cup (9) of the rotor-impeller unit (4, 6, 7, 8) is pressed by the mgnetic forces of the magnet (4) in the direction of arrow (11) against the stationary ceramic ball (10), which is fixed to the separating wall (5). The impeller (6, 7,8) is connected to the annular magnet (4) by means of the clamp (12), which fits into the slits (15) in the hub (8). The clamp (12) reaches through the bore of the annular magnet (4) and transfers the tensile force against the face of annular magnet (4). At the same time, face (14) on the other axial end of the annular magnet (4) covers the channels between the vanes.

Figure 2:
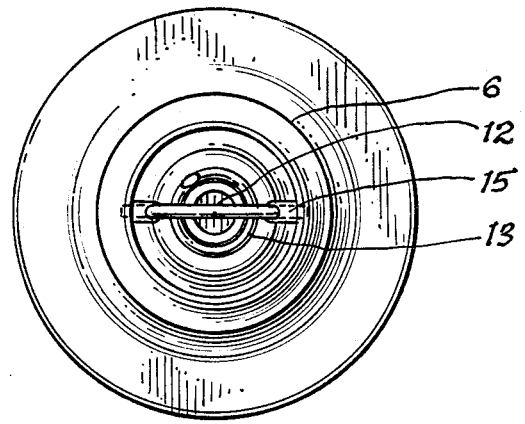
FIG. 2 is a view of an impeller from axial direction.

FIG. 2 shows a view of the rotor-impeller unit in the direction of arrow (16). The clamp (12) compresses the spring (13) and fits into the slits (15) of the hub (8).

Figure 3:
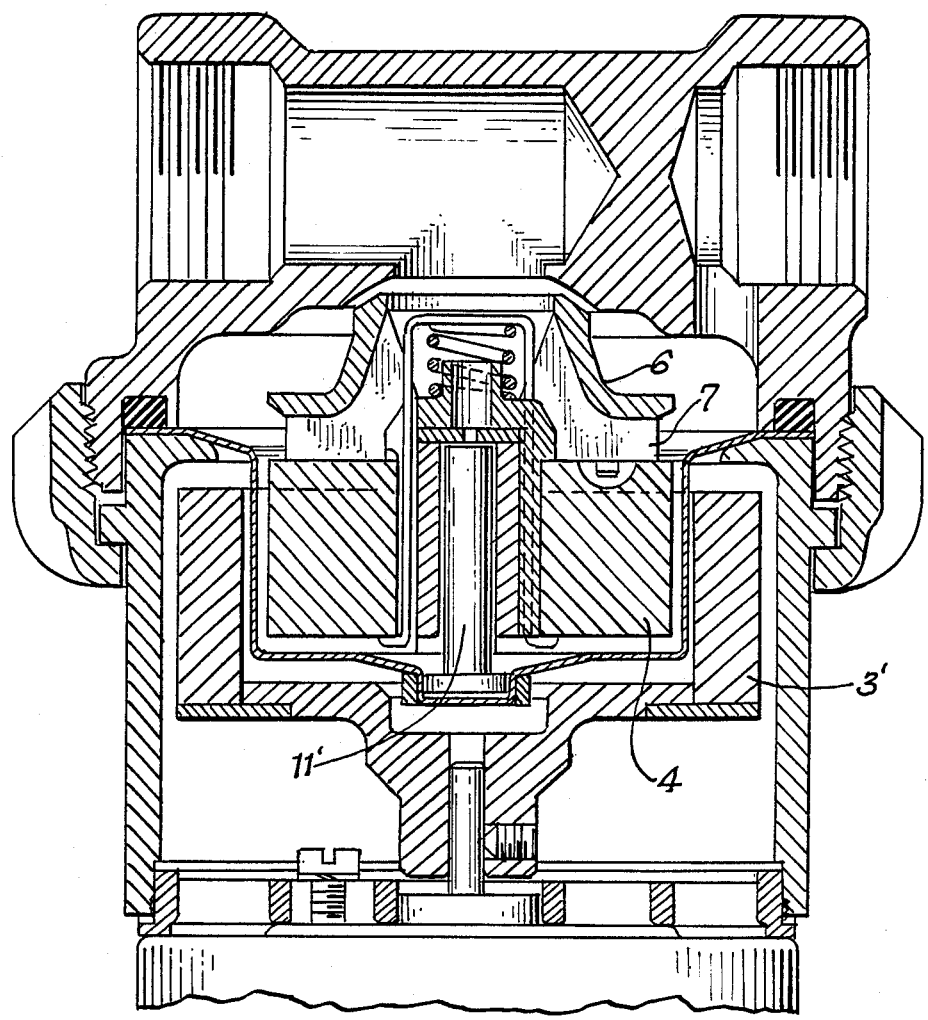
FIG. 3 shows a horizontal view through a centrifugal pump with cylindrical magnetic coupling.

FIG. 3 shows a similar design as described in FIG. 1 whereby the outer magnet (3') consists of a hollow cylinder of permanent magnetic material and the annular magnet (4') is also shaped cylindrical. The rotor-impeller-unit (4', 6, 7) is pivotably mounted on stub shaft 11'.

Figure 4:
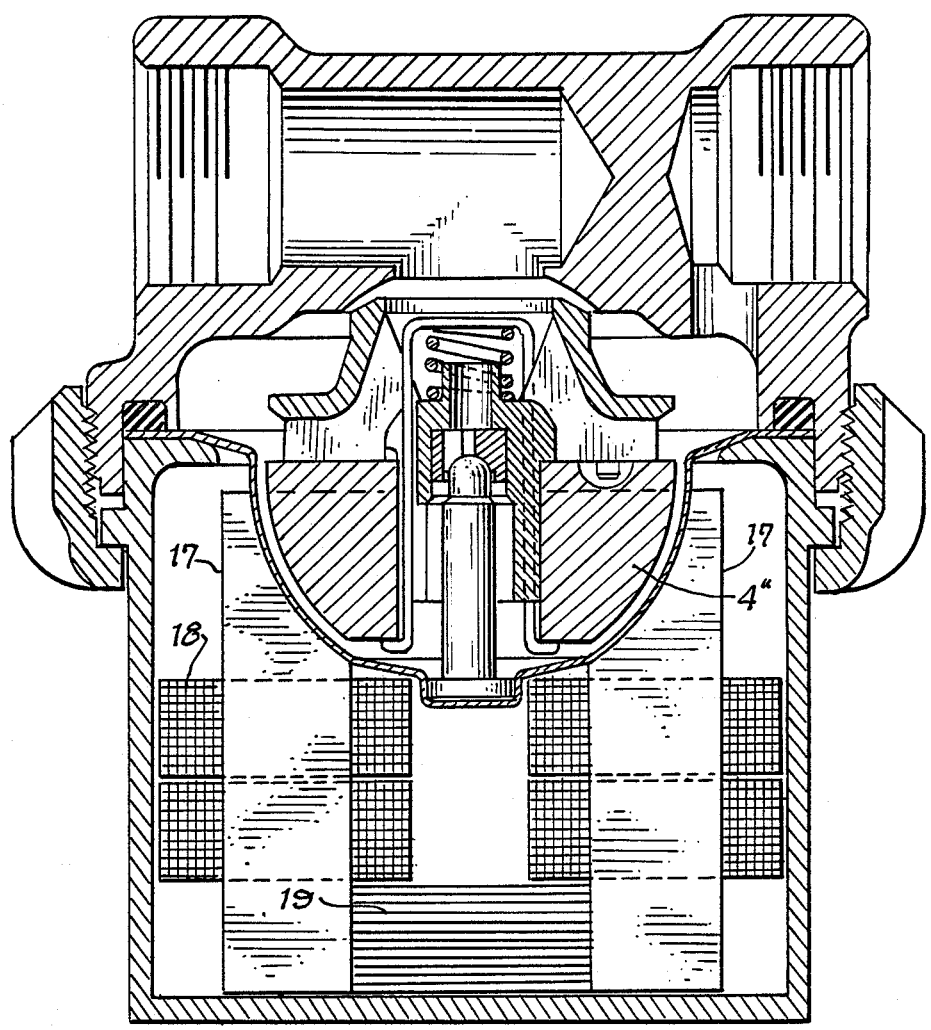
FIG. 4 shows a device with a stator generating a rotating magnetic field.

FIG. 4 shows a design similar to the design in FIG. 1 whereby the outer magnet (3) is substituted by pole pieces (17). These pole pieces carry windings 18 and are magneticaly short circuited by the yoke 19 forming a stator generating a rototing magnetic field which drives rotor (4"). Said rotor (4") is made from electrically conductive alloy and is acting as an eddycurrent armature till synchronous speed has been reached, thereafter synchronous.

I claim:

1. A rotor-impeller unit for a single stage centrifugal pump which forms a unit with a driving part, comprising a rotor having a coaxial hole and being supported by a bearing, the rotor having magnets that are driven by rotating drive magnets, the device further comprising an impeller (6,7,8) being formed by an impeller part (6,7,8) comprising a shroud (6) with an eye on the suction side which forms a narrow gap with the inlet portion of the pump housing and having numerous axially extending vanes (7) and a hub portion (8), the shroud (6) and vanes (7) being pressed against a face (14) of the rotor (4), said face forming together with the shroud (6) and the vanes (7) the impeller part (6,7,8) with channels in which liquid entering the shroud through said eye, undergoes accelleration causing continuous flow between the suction side and the pressure side of the pump housing, the hub (8) extending into the hole of the rotor (4), a pre-stressed spring (13) providing axial forces, which are transmitted by a clamp (12) made of metal wire pressing the vanes (7) against the annular face (14) of the rotor (4) and keeping the rotor (4) and impeller part (6,7,8) together.

* * * * *